(12) United States Patent
Durand

(10) Patent No.: US 9,316,463 B2
(45) Date of Patent: Apr. 19, 2016

(54) MULTIMODE SHORT WAVELENGTH INFRARED AND RADIO-FREQUENCY SEEKER

(71) Applicant: Rosemount Aerospace Inc., Burnsville, MN (US)

(72) Inventor: William Durand, Edina, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 148 days.

(21) Appl. No.: 14/274,427

(22) Filed: May 9, 2014

(65) Prior Publication Data

US 2015/0323287 A1    Nov. 12, 2015

(51) Int. Cl.

| F41G 7/22 | (2006.01) |
| --- | --- |
| F41G 7/26 | (2006.01) |
| F41G 7/28 | (2006.01) |
| F41G 7/00 | (2006.01) |
| G01S 13/86 | (2006.01) |
| H01Q 1/38 | (2006.01) |
| H01Q 21/06 | (2006.01) |
| H01Q 5/22 | (2015.01) |

(52) U.S. Cl.
CPC *F41G 7/26* (2013.01); *F41G 7/008* (2013.01); *F41G 7/2246* (2013.01); *F41G 7/2253* (2013.01); *F41G 7/2286* (2013.01); *F41G 7/2293* (2013.01); *F41G 7/28* (2013.01); *G01S 13/867* (2013.01); *H01Q 1/38* (2013.01); *H01Q 5/22* (2015.01); *H01Q 21/065* (2013.01)

(58) Field of Classification Search
CPC ......... G01S 13/86; G01S 13/867; H01Q 1/36; H01Q 1/38; H01Q 5/20; H01Q 5/22; H01Q 21/06; H01Q 21/061; H01Q 21/065; H01Q 3/44; H01Q 3/46; F41G 7/008; F41G 7/20; F41G 7/22; F41G 7/2246; F41G 7/2253; F41G 7/2273; F41G 7/2286; F41G 7/2293; F41G 7/24; F41G 7/26; F41G 7/28; H01L 31/08; H01L 31/09
USPC ......... 244/3.1–3.19; 343/700 MS; 250/338.1, 250/338.4
See application file for complete search history.

(56) References Cited

U.S. PATENT DOCUMENTS

| 4,654,622 A * | 3/1987 | Foss ......................... H01Q 1/38 343/700 MS |
| --- | --- | --- |
| 5,248,884 A * | 9/1993 | Brewitt-Taylor ....... H01L 31/09 250/338.4 |
| 6,150,974 A | 11/2000 | Tasaka et al. |
| 6,268,822 B1 | 7/2001 | Sanders et al. |
| 7,623,071 B2 * | 11/2009 | Ginn ........................ H01Q 3/46 343/700 MS |
| 2006/0033663 A1 | 2/2006 | Saint Clair et al. |

FOREIGN PATENT DOCUMENTS

GB    2240881 A    8/1991

OTHER PUBLICATIONS

The European Search Report mailed Sep. 21, 2015 for European Application No. 15166751.6.
CISCO White Paper, "Antenna Patterns and Their Meaning", C11-422494-00, Aug. 2007.

* cited by examiner

*Primary Examiner* — Bernarr Gregory
(74) *Attorney, Agent, or Firm* — Kinney & Lange, P.A.

(57) ABSTRACT

A multimode seeker includes a radio-frequency antenna and a controller. The radio-frequency antenna comprises a substrate and an electrically conductive film deposited on the substrate. The substrate is transparent to short wavelength infrared radiation. The electrically conductive film is configured to transmit and receive radio-frequency radiation and is transparent to the short wavelength infrared radiation. The controller is configured to receive and interpret data from the radio-frequency antenna.

15 Claims, 2 Drawing Sheets

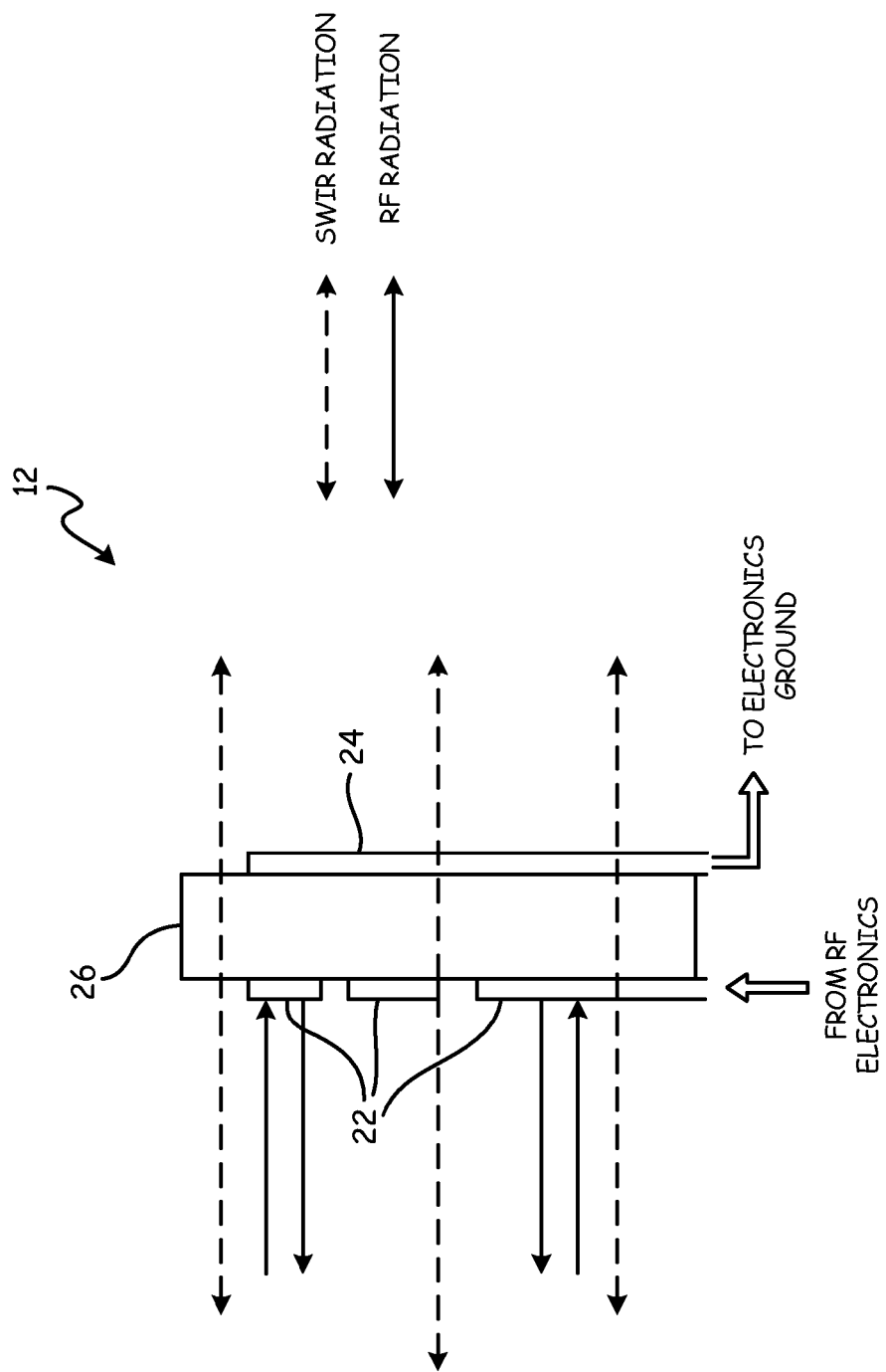

MULTIMODE SHORT WAVELENGTH INFRARED AND RADIO-FREQUENCY SEEKER

BACKGROUND

The present invention relates generally to multimode sensors, and in particular to a multimode short wavelength infrared (SWIR) and radio-frequency (RF) seeker.

Airborne platforms, such as airborne munitions, may include sensors. One such sensor, for example, is a seeker. Seekers may be configured to receive electromagnetic radiation, often in the visible or infrared spectrum, through an aperture and perform image detection that may be utilized for guidance and navigation of the munition. Another seeker function that may be utilized is semi-active laser (SAL) detection. In SAL detection, a beam of laser radiation is directed at a target. The seeker detects the radiation reflected from the target and adjusts the munition's navigation accordingly. Imaging and SAL detection seekers are often implemented in the "nose" of the munition for ease in receiving radiation in the direction of flight and guiding the flight path.

Airborne objects may also include radio-frequency (RF) sensors. RF sensors transmit and receive electromagnetic energy in the RF spectrum through an aperture. RF sensors may be utilized as, among other things, height-of-burst (HOB) sensors. HOB sensors employ active radar to measure the range from the munition to the target object in order to command payload initiation at a predetermined distance from the target. Ideally, the RF sensor would also be implemented at the "nose" of the munition for optimal sensor performance and payload initiation functions. Some munitions include multiple sensors utilizing multiple respective apertures under a common radome. Other munitions locate the seeker in the "nose" of the munition and locate the RF sensor, for example, within the structure of the munition having an RF aperture on an outer surface. Each of these implementations has disadvantages, including increased cost, difficult packaging and suboptimal performance. It is desirable to create a sensor that utilizes a common aperture to act both as a seeker, as well as an RF antenna.

SUMMARY

A multimode seeker includes a radio-frequency antenna and a controller. The radio-frequency antenna comprises a substrate and an electrically conductive film deposited on the substrate. The substrate is transparent to short wavelength infrared radiation. The electrically conductive film is configured to transmit and receive radio-frequency radiation and is transparent to the infrared radiation. The controller is configured to receive and interpret data from the radio-frequency antenna and the focal plane array.

BRIEF DESCRIPTION OF THE DRAWINGS

FIG. 2 is a cross-sectional view of an electrically conductive and optically transparent antenna.

DETAILED DESCRIPTION

Figure 1:
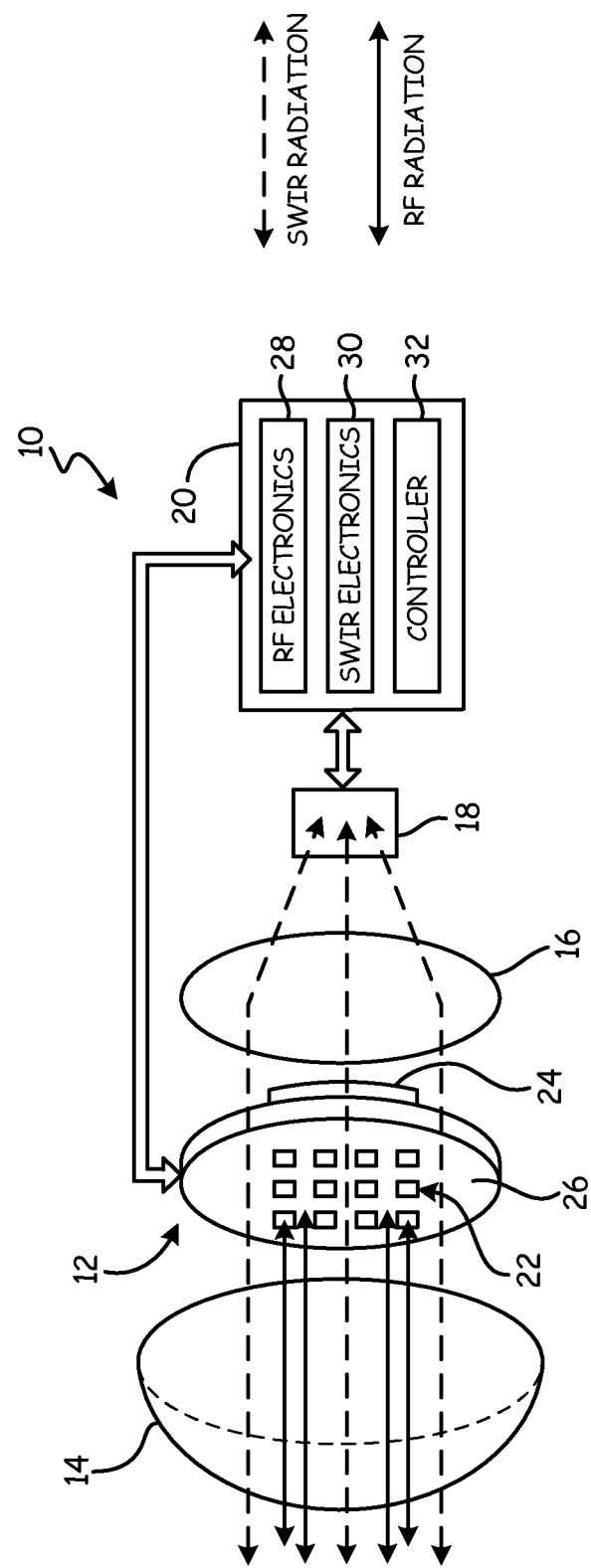
FIG. 1 is an exploded view of a multimode seeker that includes an electrically conductive and optically transparent antenna.

A multimode sensor is disclosed herein that includes an electrically conductive and optically transparent antenna that allows propagation of short wavelength infrared (SWIR) electromagnetic radiation as well as bidirectional transmission of radio-frequency (RF) electromagnetic radiation. The multimode sensor includes an antenna that includes an optically transparent substrate with an optically transparent and electrically conductive film deposited thereon. The film may be deposited on the substrate to form, for example, a microstrip antenna that both transmits and receives RF radiation. The film may be transparent for SWIR and/or visible electromagnetic radiation. Optics may be positioned behind the antenna to focus the propagated electromagnetic radiation to a focal plane array to perform, for example, imaging functions or semi-active laser (SAL) detection. This allows the multimode sensor to act as both a SWIR seeker and an RF antenna using a single aperture and single electromagnetic radiation path for both SWIR and RF electromagnetic radiation which allows reduction of the overall size, weight, and cost of these sensors, which is critical to many munitions applications.

FIG. 1 is an exploded view of multimode seeker 10 that includes electrically conductive and optically transparent antenna 12. Multimode seeker 10 includes antenna 12, radome 14, optics 16, short wavelength infrared detector 18, and electronics 20. Antenna 12 includes patch array 22, ground plane 24, and substrate 26. Electronics 20 includes RF electronics 28, SWIR electronics 30, and controller 32. RF radiation is illustrated in FIG. 1 as arrows with solid lines and SWIR radiation is illustrated with dashed lines. Electronics 20 may include multiple electronics "cards" that include, for example, digital processing and communications protocols, power conditioning, interface protocols, and any other electronics utilized by multimode seeker 10. RF electronics 28, SWIR electronics 30, and controller 32 may be implemented as separate electronics systems, or may be implemented as a common electronics system. Controller 32 may be, for example, a digital signal processor or any other type of digital logic device capable of controlling and guiding a flight body upon which multimode seeker 10 is implemented.

Antenna 12 may be implemented as a microstrip (or "patch") antenna that includes patch array 22, ground plane 24, and substrate 26. Although illustrated as a three-by-four patch array, array 22 may be implemented as any microstrip antenna configuration. Patch array 22 and ground plane 24 may be formed using material that is both electrically conductive and optically transparent. Substrate 26 may be any dielectric material that is optically transparent such as, for example, infrared extended glass or sapphire. Patch antennas are advantageous for airborne sensor applications because they are lightweight, inexpensive, and easy to integrate with accompanying electronics.

With transparent conducting films, increasing the thickness and increasing the concentration of charge carriers will increase the material's conductivity, but decrease its transparency. A Drude metal model in the time or frequency domain, for example, may be utilized as a guide to determine a desirable thickness of the film. In an embodiment, any material may be selected that includes, for example, greater than ninety percent transmittance across the SWIR spectrum, and an electrical conductivity of at least approximately $10^{-4}$ ohm-centimeters. One such material is indium tin oxide (ITO).

ITO is a heavily-doped n-type semiconductor with a large bandgap of approximately four electron-volts (eV). Because of this bandgap, ITO is mostly transparent in the visible and infrared region of the electromagnetic spectrum. The ITO may be tailored to provide improved performance of the film. For example, a reactive film forming atmosphere may be adjusted during deposition, zirconium oxide ($ZrO_2$) may be added, and/or tin may be removed to obtain more indium oxide ($In_2O_3$). Adding $ZrO_2$ may produce films that maintain high transparency at low oxygen partial pressures and maintain high carrier concentration at higher oxygen partial pressures which may be utilized to widen the process window during the production of the transparent conducting oxide (TCO). Adding $ZrO_2$ to an ITO target may also improve the film transparency beyond that predicted by a Drude metal model. In other embodiments, other materials, such as other TCO host materials, or extremely thin gold or silver films may be deposited to form antenna 12.

With continued reference to FIG. 1, FIG. 2 is a cross-sectional view of antenna 12. Patch array 22 and ground plane 24 may be formed, for example, through reactive deposition methods and deposited on substrate 26. Deposition onto substrate 26 may be accomplished, for example, utilizing any deposition method such as metal-organic chemical vapor deposition or reactive physical sputtering, and patterned using a mask, photolithography or other segmenting methods. The arrangement and configuration of antenna 12 may be selected to shape the RF beam produced by antenna 12 at a desired frequency. For example, although illustrated with a plurality of patches 22 spaced from ground plane 24, any configuration of microstrip antenna may be implemented using an electrically conductive and optically transparent film. In the embodiment shown in FIG. 2, patch array 22 is fed from RF electronics 28 (illustrated in FIG. 2) and ground plane 24 is connected to a common electronics ground. This ground may be, for example, a floating ground utilized by electronics 20. In other embodiments, any type of feed for a patch antenna may be utilized such as, for example, a coaxial cable connection to ground plane 24 from RF electronics 28 that includes a feed probe between ground plane 24 and patch array 22. Other tailorable properties of antenna 12 include, among others, the thickness of film utilized for patch array 22, the number of patches of patch array 22, the material of patch array 22 and ground plane 24, the material of substrate 26, and the thickness of substrate 26.

Utilizing antenna 12, multimode seeker 10 may produce an RF channel and act as a passive RF antenna. Passive detection of RF radiation allows seeker 10 to act in an anti-radiation mode. In an anti-radiation mode, antenna 12 receives RF emissions from a target system. Electronics 20 may utilize the information received by antenna 12 to, for example, guide to a target. RF electronics 28 may, for example, calculate and provide a new bearing angle for the munition upon which seeker 10 is installed. Controller 32 may then control, for example, actuators of the munition airframe (not shown) to control the trajectory of the munition.

Multimode seeker 10 may also utilize antenna 12 to act as an RF transmitter. In an embodiment, seeker 10 may utilize RF transmission to function as a height-of-burst (HOB) sensor. HOB sensors employ active radar to measure a range from the munition to a target object. Antenna 12 may transmit RF radiation and electronics 20 may determine a range to a target based upon RF radiation reflected and received by antenna 12. At a predetermined distance from the target, electronics 20 may execute, for example, a payload initiation command. Ideally, a HOB sensor is placed at a forward end of the flight body so that seeker 10 may guide the flight body by keeping both sensor 10 and the object of interest on a common centerline. RF functionality employed within a HOB sensor can also be used to implement a bidirectional seeker, where RF radiation is propagated in the forward flight direction, reflected from targets, captured by antenna 12 and processed for use in munition airframe navigation. This functionality can be further employed to implement a radio communications transceiver.

In addition to RF modes of operation, multimode seeker 10 may function as an imaging device. Visible or infrared radiation, such as radiation of, for example, 0.7 microns to 1.7 microns in wavelength, is received through radome 14, on the same path as RF radiation received by antenna 12. The SWIR radiation, as illustrated in FIGS. 1 and 2 by dashed lines, propagates through antenna 12 and is focused by optics 16 onto short wavelength infrared detector 18. Optics 16 may be placed between antenna 12 and short wavelength infrared detector 18 to prevent any degradation of received RF radiation by optics 16 prior to the RF radiation reaching antenna 12. Optics 16 may be implemented for example, as reflective optics or refractive optics. Patch array 22, ground plane 24, and substrate 26 are all transparent to SWIR radiation and therefore, the SWIR radiation is not degraded by antenna 12 prior to reaching optics 16. Although illustrated as implemented between antenna 12 and detector 18, in other embodiments, optics 16 may be place between radome 14 and antenna 12.

Short wavelength infrared detector 18 may be implemented, for example, as a focal plane array with a two-dimensional array of photodetectors. Photons of the SWIR radiation hit these photodetectors and generate electrons that are received by SWIR electronics 30 and converted into digital signals. SWIR electronics 30 are any electronics that may perform image processing on the signals received from focal plane array 16. SWIR electronics 30 may include, for example, a digital signal processor. SWIR electronics 30 may communicate with controller 32 to control, for example, the navigation of the flight body upon which multimode seeker 10 is implemented. Short wavelength infrared detector 18 may also be implemented, for example, as any other SWIR detection device, such as a single element SWIR detection surface, or a matrix of SWIR detection surfaces. A "quadrature seeker," for example, may include four SWIR detection surfaces implemented perpendicular to a flight axis.

Multimode seeker 10 may also utilize SWIR detection to function as a semi-active laser (SAL) detector. For SAL detection, a beam of laser radiation is directed at a desired target from a laser source (not shown). The beam reflects off of the target, scattering back toward a munition on which multimode seeker 10 may be implemented. The laser reflection may be at a SWIR wavelength and thus, antenna 12 is transparent to the reflection, allowing the reflection to propagate through antenna 12 and optics 16 to short wavelength infrared detector 18. SWIR electronics 30 may detect, decode and localize the laser reflections and provide data to controller 32. Controller 32 may utilize the data from SWIR electronics 30 to adjust the navigation of the airborne device upon which multimode seeker 10 is implemented. Ideally, both imaging seekers and SAL seekers are also positioned at the forward end of the flight body.

Both RF radiation and SWIR radiation enter multimode seeker 10 through radome 14 along a common path and common aperture formed, for example, by a housing of seeker 10 (not shown). Prior art systems required multiple sensors or multiple apertures under a common radome to perform both RF detection and SWIR detection. By implementing an optically transparent and electrically conductive antenna, the same aperture and radiation path may be utilized for both RF functionality and SWIR functionality. This reduces the size, weight, and cost of flight body sensors and allows colocation of RF and SWIR sensors at the forward end of the flight body, critical to many applications.

Discussion of Possible Embodiments

The following are non-exclusive descriptions of possible embodiments of the present invention.

A multimode seeker includes, among other things, a radio-frequency antenna and a controller. The radio-frequency antenna comprises a substrate and an electrically conductive film deposited on the substrate. The substrate is transparent to short wavelength infrared radiation. The electrically conductive film is configured to transmit and receive radio-frequency radiation and is transparent to the infrared radiation. The controller is configured to receive and interpret data from the radio-frequency antenna.

The multimode seeker of the preceding paragraph can optionally include, additionally and/or alternatively, any one or more of the following features, configurations and/or additional components:

A further embodiment of the foregoing multimode seeker, further comprising optics and a short wavelength infrared detector, wherein the optics focus the short wavelength infrared radiation to the short wavelength infrared detector, and wherein the optics are positioned between the radio-frequency antenna and the short wavelength infrared detector.

A further embodiment of any of the foregoing multimode seekers, further comprising a radome, wherein the short wavelength infrared detector is a focal plane array, and wherein the radio-frequency antenna is positioned between the radome and the optics, and wherein the short wavelength infrared radiation and the radio-frequency radiation are both received by the sensor through the radome.

A further embodiment of any of the foregoing multimode seekers, wherein the controller is further configured to control navigation of a flight body, wherein the multimode seeker is implemented within the flight body.

A further embodiment of any of the foregoing multimode seekers, wherein the electrically conductive film is transparent to greater than ninety percent of short wavelength infrared radiation and has a conductivity of approximately $10^{-4}$ ohm-centimeters.

A further embodiment of any of the foregoing multimode seekers, wherein the electrically conductive film is indium tin oxide (ITO) and the substrate is glass and/or sapphire.

A further embodiment of any of the foregoing multimode seekers, wherein the film coating forms a patch antenna on the substrate configured to emit and receive radio-frequency energy.

A further embodiment of any of the foregoing multimode seekers, wherein the patch antenna comprises a patch array deposited on a first side of the substrate, and a ground plane deposited on a second side of the substrate.

A sensor for use on a flight body includes, among other things, a patch antenna, a short wavelength infrared detector, and sensor electronics. The patch antenna transmits and receives radio-frequency radiation. The short wavelength infrared detector receives short wavelength infrared radiation. The patch antenna is transparent to the short wavelength infrared radiation, and the short wavelength infrared radiation propagates through the patch antenna to the short wavelength infrared detector. The sensor electronics that control the flight body based upon data received from the patch antenna and the short wavelength infrared detector.

The sensor of the preceding paragraph can optionally include, additionally and/or alternatively, any one or more of the following features, configurations and/or additional components:

A further embodiment of the foregoing sensor, wherein the patch antenna comprises a substrate that is transparent to the short wavelength infrared radiation, and an electrically conductive film deposited on the substrate and configured to transmit and receive the radio-frequency radiation, wherein the electrically conductive film is transparent to the short wavelength infrared radiation.

A further embodiment of any of the foregoing sensors, wherein the electrically conductive film comprises a patch array deposited on a first side of the substrate, wherein the patch array is connected to the sensor electronics, and a ground plane deposited on a second side of the substrate, wherein the ground plane is connected to an electronics ground.

A further embodiment of any of the foregoing sensors, wherein the electrically conductive film is transparent to greater than ninety percent of short wavelength infrared radiation and has a conductivity of approximately $10^{-4}$ ohm-centimeters.

A further embodiment of any of the foregoing sensors, wherein the electrically conductive film is indium tin oxide (ITO).

A further embodiment of any of the foregoing sensors, further comprising optics to focus the short wavelength infrared radiation to the short wavelength detector, wherein the short wavelength detector is a focal plane array, and wherein the optics are positioned between the patch antenna and the focal plane array.

A further embodiment of any of the foregoing sensors, further comprising a radome, wherein the patch antenna is positioned between the radome and the optics, and wherein the short wavelength infrared radiation and the radio-frequency radiation are both received by the sensor through the radome.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A multimode seeker comprising:
   a radio-frequency antenna comprising:
      a substrate that is transparent to short wavelength infrared radiation; and
      an electrically conductive film deposited on the substrate and configured to transmit and receive radio-frequency radiation, wherein the electrically conductive film is transparent to the short wavelength infrared radiation; and
   a controller configured to receive and interpret data from the radio-frequency antenna.

2. The multimode seeker of claim 1, further comprising optics and a short wavelength infrared detector that receives the short wavelength infrared radiation, wherein the optics focus the short wavelength infrared radiation to the short wavelength infrared detector, and wherein the optics are positioned between the radio-frequency antenna and the short wavelength infrared detector.

3. The sensor of claim 2, further comprising a radome, wherein the short-wavelength infrared detector is a focal plane array, and wherein the radio-frequency antenna is positioned between the radome and the optics, and wherein the short wavelength infrared radiation and the radio-frequency radiation are both received by the sensor through the radome.

4. The multimode seeker of claim 1, wherein the controller is further configured to control navigation of a flight body, wherein the multimode seeker is implemented within the flight body.

5. The multimode seeker of claim 1, wherein the electrically conductive film is transparent to greater than ninety percent of short wavelength infrared radiation and has a conductivity of approximately $10^{-4}$ ohm-centimeters.

6. The multimode seeker of claim 5, wherein the electrically conductive film is indium tin oxide (no) and the substrate is glass and/or sapphire.

7. The multimode seeker of claim 1, wherein the film coating forms a patch antenna on the substrate configured to emit and receive radio-frequency energy.

8. The multimode seeker of claim 7, wherein the patch antenna comprises:
   a patch array deposited on a first side of the substrate; and
   a ground plane deposited on a second side of the substrate.

9. A sensor for use on a flight body, the sensor comprising:
   a patch antenna that transmits and receives radio-frequency radiation;
   a short wavelength infrared detector that receives short wavelength infrared radiation, wherein the patch antenna is transparent to the short wavelength infrared radiation, and wherein the short wavelength radiation propagates through the patch antenna to the short wavelength infrared detector; and
   sensor electronics that control the flight body based upon data received from the patch antenna and the short wavelength infrared detector.

10. The sensor of claim 9, wherein the patch antenna comprises:
    a substrate that is transparent to the short wavelength infrared radiation; and
    an electrically conductive film deposited on the substrate and configured to transmit and receive the radio-frequency radiation, wherein the electrically conductive film is transparent to the short wavelength infrared radiation.

11. The sensor of claim 10, wherein the electrically conductive film comprises:
    a patch array deposited on a first side of the substrate, wherein the patch array is connected to the sensor electronics; and
    a ground plane deposited on a second side of the substrate, wherein the ground plane is connected to an electronics ground.

12. The sensor of claim 10, wherein the electrically conductive film is transparent to greater than ninety percent of short wavelength infrared radiation and has a conductivity of approximately $10^4$ ohm-centimeters.

13. The sensor of claim 12, wherein the electrically conductive film is indium tin oxide (no).

14. The sensor of claim 9, further comprising optics to focus the short wavelength infrared radiation to the short wavelength infrared detector, wherein the short wavelength infrared detector is a focal plane array, and wherein the optics are positioned between the patch antenna and the focal plane array.

15. The sensor of claim 14, further comprising a radome, wherein the patch antenna is positioned between the radome and the optics, and wherein the short wavelength infrared radiation and the radio-frequency radiation are both received by the sensor through the radome.

* * * * *

UNITED STATES PATENT AND TRADEMARK OFFICE
CERTIFICATE OF CORRECTION

| | | |
|---|---|---|
| PATENT NO. | : 9,316,463 B2 | Page 1 of 1 |
| APPLICATION NO. | : 14/274427 | |
| DATED | : April 19, 2016 | |
| INVENTOR(S) | : William Durand | |

It is certified that error appears in the above-identified patent and that said Letters Patent is hereby corrected as shown below:

Claims

Col. 7, Line 10, claim 6
    Delete "no"
    Insert --ITO--

Col. 8, Line 20, claim 13
    Delete "no"
    Insert --ITO--

Signed and Sealed this
Thirty-first Day of May, 2016

Michelle K. Lee
*Director of the United States Patent and Trademark Office*